(12) United States Patent
McReynolds et al.

(10) Patent No.: US 7,888,892 B2
(45) Date of Patent: Feb. 15, 2011

(54) MOBILE ELECTRONIC APPARATUS HAVING A RECHARGEABLE STORAGE DEVICE

(75) Inventors: Alan A. McReynolds, Los Altos, CA (US); Bernardo Huberman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 11/779,547

(22) Filed: Jul. 18, 2007

(65) Prior Publication Data

US 2009/0021191 A1 Jan. 22, 2009

(51) Int. Cl.
H02K 33/00 (2006.01)

(52) U.S. Cl. .................. 318/114; 318/139; 318/686

(58) Field of Classification Search .............. 318/3, 318/17, 37, 686, 690, 114, 140, 159, 161, 318/700, 727, 244, 139; 310/80, 81
See application file for complete search history.

(56) References Cited

U.S. PATENT DOCUMENTS

| | | | |
|---|---|---|---|
| 4,709,176 A | 11/1987 | Ridley et al. | |
| 5,001,685 A | 3/1991 | Hayakawa | |
| 5,798,588 A * | 8/1998 | Okuyama et al. | 310/81 |
| 6,252,336 B1 | 6/2001 | Hall | |
| 6,278,663 B1 * | 8/2001 | Okeya et al. | 368/204 |
| 6,304,176 B1 * | 10/2001 | Discenzo | 340/539.26 |
| 6,324,084 B1 * | 11/2001 | Fujisawa | 363/127 |
| 6,346,791 B1 | 2/2002 | Barguirdjian | |
| 6,438,393 B1 | 8/2002 | Suuronen | |
| 6,978,161 B2 | 12/2005 | Tu et al. | |
| 2004/0204180 A1 | 10/2004 | Liao | |
| 2004/0222638 A1 * | 11/2004 | Bednyak | 290/1 R |
| 2006/0290662 A1 * | 12/2006 | Houston et al. | 345/156 |

* cited by examiner

Primary Examiner—Bentsu Ro
Assistant Examiner—Antony M Paul

(57) ABSTRACT

A mobile electronic apparatus includes a storage device for storing electrical energy and a rotating mechanism configured to energize the apparatus. The rotating mechanism includes a motor, a shaft connected to the motor, and a mass eccentrically attached to the shaft, where the motor is configured to rotate the shaft and the mass to cause the mobile electronic apparatus to vibrate when activated, where motion of the mobile electronic apparatus is configured to cause the mass and the shaft to rotate with respect to the motor, and where rotation of the shaft with respect to the motor is converted into electrical energy. The apparatus also includes circuitry for harvesting the electrical energy and for recharging the storage device with the harvested electrical energy.

16 Claims, 3 Drawing Sheets

MOBILE ELECTRONIC APPARATUS HAVING A RECHARGEABLE STORAGE DEVICE

BACKGROUND

There has been explosive growth in the use of portable electronic devices, such as, pagers, cellular telephones, media players, and personal digital assistants. Along with this growth has been an ever-increasing trend towards miniaturizing the portable electronic devices while simultaneously increasing the number of features on the portable electronic devices. This increase in features includes combining features from various different types of devices, such as, cellular telephones and media players.

One result of this miniaturization trend has been the reduction in the size of the batteries used to power the electronic devices. The reduced battery sizes have reduced the length of time the electronic devices are useable between charges.

In an effort to further reduce the sizes of the electronic devices, U.S. Pat. No. 6,252,336 to Hall proposes a scheme to replace the silent or vibrating alarm mechanism found in some portable electronic devices with a smaller piezoelectric device. In addition, Hall discloses that the piezoelectric device includes a mass, in which, mechanical movement of the mass, as caused by movement of the electronic device, is converted into electrical energy and used to recharge a battery. Because piezoelectric devices typically require high frequency movements, it appears that the electronic device disclosed in Hall would have to be moved relatively rapidly in order to generate any appreciable amounts of electrical energy. In other words, users would most likely be required to consciously move the electronic device to recharge the battery. In addition, the replacement of conventional vibrating mechanisms with the piezoelectric devices will, in most likelihood, be a relatively complicated process which significantly adds to the costs associated with manufacturing the electronic devices.

It would therefore be beneficial to be able to recharge the batteries without the additional costs and burdens associated with the piezoelectric device proposed by Hall.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a mobile electronic apparatus having a vibrating or silent alarm feature. The vibrating or silent alarm feature is activated through rotation of a rotating mechanism having an unbalanced weight. More particularly, when the unbalanced weight is rotated about a shaft, the rotation of the unbalanced weight generally causes the mobile electronic apparatus to vibrate.

The rotating mechanism is also employed to recharge an electrical energy storage device of the mobile electronic apparatus. The storage device may comprise a battery of the mobile electronic apparatus or it may comprise a separate component, such as, a capacitor, a super capacitor, an ultra capacitor, etc. In any regard, relative motion of the mobile electronic apparatus caused during normal movement, such as, when a user walks, runs, drives, etc., causes the unbalanced mass to rotate, the mechanical energy contained in rotation as captured by a motor, is converted into electrical energy, which is supplied into the storage device. The energy supplied into the storage device may be used in performing various operations of the mobile electronic apparatus, and may thus supplement power supplied by a battery. In addition, the energy may also be supplied to a capacitor, such as a rechargeable battery, to thereby recharge the battery.

In addition, or alternatively, the storage device may receive electrical energy from relative motion of a relatively heavy component in the mobile electronic apparatus, such as the battery, etc., with respect to a casing of the mobile electronic apparatus. As further disclosed herein, the mobile electronic apparatus may be equipped with a linear motor having a first part fixedly attached to the casing and a second part fixedly attached to the relatively heavy component, which is movable with respect to the casing. As such, when the mobile electronic apparatus is moved, such as, during normal user movement, the mechanical energy associated with the relative movement between the second part of the linear motor on the relatively heavy component and the first part of the linear motor on the casing is converted into electrical energy and supplied to the storage device.

Further disclosed herein is a method of implementing either or both of the rotating mechanism and the linear motor to recharge the storage device.

Figure 1:
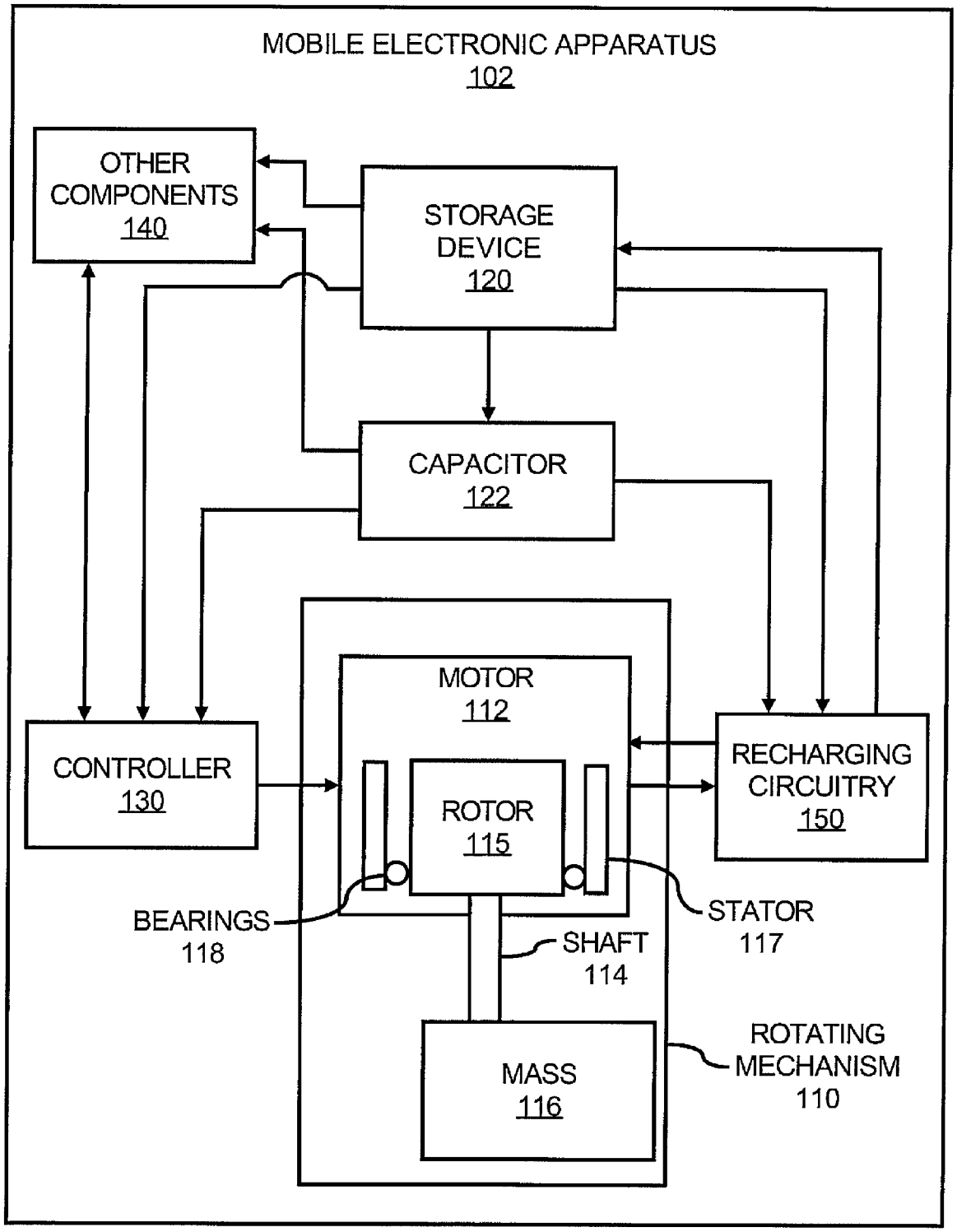
FIG. 1 shows a simplified block diagram of mobile electronic apparatus having a vibrating or silent alarm feature for use in recharging a storage device, according to an embodiment of the invention.

With reference first to FIG. 1, there is shown a simplified block diagram 100 of a mobile electronic apparatus 102 having a vibrating or silent alarm feature, according to an example. It should be understood that the following description of the mobile electronic apparatus 102 is but one manner of a variety of different manners in which the mobile electronic apparatus 102 may be configured. In addition, it should be understood that the mobile electronic apparatus 102 may include additional components and that some of the components described herein may be removed and/or modified without departing from a scope of the mobile electronic apparatus 102 depicted in FIG. 1.

The mobile electronic apparatus 102 may comprise any portable electronic device configured with a vibrating or a silent alarm feature, such as, the rotating mechanism 110, and a storage device 120 configured to store electrical energy. By way of example, the mobile electronic apparatus 102 may comprise a cellular telephone, a personal digital assistant, a media player, a game controller, a portable video game system, etc.

Generally speaking, the rotating mechanism 110 is designed and configured to not only cause the mobile electronic apparatus 102 to vibrate, but to also convert movement of the mobile electronic apparatus into electrical energy that is stored in the storage device 120. In one regard, the rotating mechanism 110 may comprise a modified version of rotating mechanisms employed in conventional electronic devices having vibrating or silent alarm features, as described in greater detail herein below. As such, mobile electronic apparatuses 102 may be fabricated to have the recharging capabilities as discussed herein without substantial increases in costs or labor over conventionally constructed mobile electronic apparatuses 102. In addition, the storage device 120 may be recharged as a result of relatively normal user movements.

As shown in FIG. 1, the rotating mechanism 110 is composed of a motor 112, a shaft 114, and a mass 116. The mass 116 is depicted as being unbalanced with respect to the rotational axis of the shaft 114. In other words, the mass 116 is eccentrically attached to the shaft 114. In this regard, as the motor 112 rotates the shaft 114, the center of gravity of the mass 116 rotates about the shaft 114 to produce a vibration, thus causing the mobile electronic apparatus 102 to vibrate.

The motor 112 is controlled by a controller 130, which may comprise a microprocessor, a micro-controller, an application specific integrated circuit (ASIC), or the like, configured to perform various processing functions in the mobile electronic apparatus. The controller 130 may be configured or programmed to activate the motor 112, for instance, by controlling the delivery of electrical energy from either or both of the storage device 120 and a capacitor 122, which may comprise a battery, under various circumstances depending upon the type of device the mobile electronic apparatus 102 comprises. For instance, if the mobile electronic apparatus 102 comprises a cellular telephone, the controller 130 may be configured or programmed to activate the motor 112 in response to receipt of an incoming telephone call. As another example, if the mobile electronic apparatus 102 comprises a video game controller or a portable video game system, the controller 132 may be configured or programmed to activate the motor 112 to cause the mobile electronic apparatus 102 to vibrate in conjunction with various action sequences occurring in a video game.

As also shown, the controller 130 is configured to receive power from either or both of the storage device 120 and the capacitor 122 and may also be configured to operate other components 140 in the mobile electronic apparatus 102, which also receive power from either or both of the storage device 120 and the capacitor 122. The other components 140 may comprise, for instance, various other circuits or programs contained in the mobile electronic apparatus 102. The other components 140 may include, for instance, various multimedia programs, voice-dialing mechanisms, input keys, etc.

In any regard, the shaft 114 is attached to a rotor 115 in the motor 112. The motor 112 also includes a stator 117 that generates a magnetic field which causes the rotor 115, and thus, the shaft 114 to rotate. The motor 112 also includes bearings 118 positioned to enable the rotor 115 to rotate with respect to the stator 117. In one example, the bearings 118 comprise relatively higher efficiency bearings than are customary in conventional rotating mechanisms 110 to generally enable the rotor 115 to rotate more freely with respect to the stator 117.

As discussed in greater detail herein below, the mechanical energy in the relative rotation of the rotor 115 with respect to the stator 117 may be converted into electrical energy through operation of the rotor 115 and the stator 117. The mobile electronic apparatus 102 includes circuitry 150 designed and configured to supply the electrical energy converted from the motor 112 to the storage device 120.

In addition, the recharging circuitry 150 may be configured to be inactive when the motor 112 receives power from either or both of the storage device 120 and the capacitor 122. The recharging circuitry 150 may thus include circuitry for switching the flow of electrical energy from the motor 112 to the storage device 120 and from the storage device 120 and capacitor 122 to the motor 112.

Figure 2:
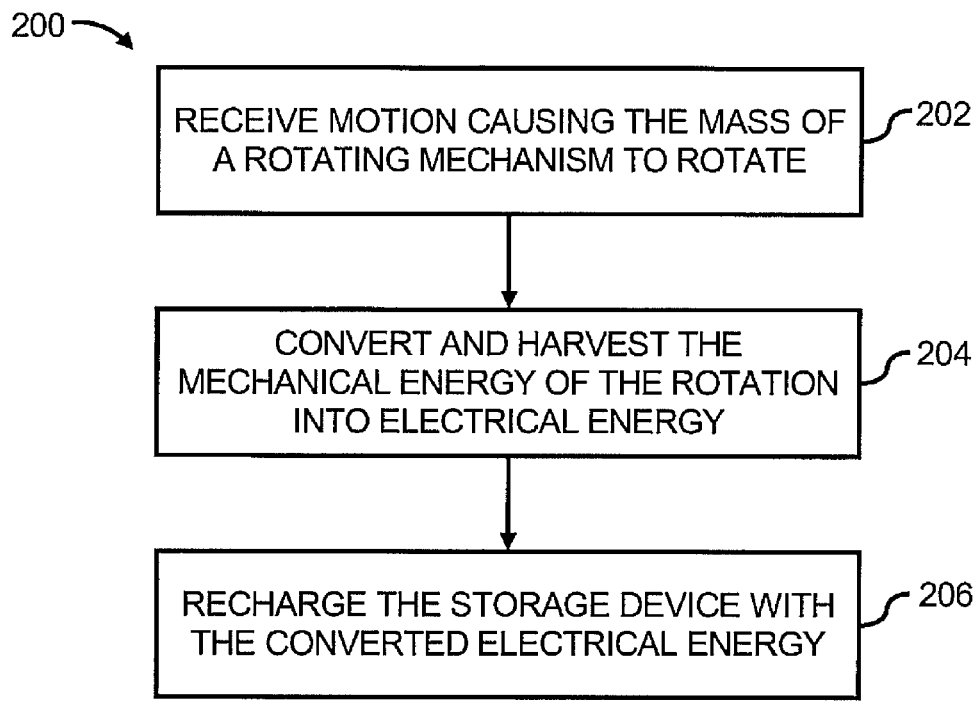
FIG. 2 shows a flow diagram of a method for recharging a storage device of a mobile electronic apparatus having a rotating mechanism, according to an embodiment of the invention.

Turning now to FIG. 2, there is shown a flow diagram of a method 200 for recharging a storage device 120 of a mobile electronic apparatus 102 having a rotating mechanism 110 composed of a motor 112, a shaft 114, and a mass 116 eccentrically attached to the shaft 114, according to an example. It should be apparent to those of ordinary skill in the art that the method 200 represents a generalized illustration and that other steps may be added or existing steps may be removed, modified or rearranged without departing from a scope of the method 200.

The description of the method 200 is made with reference to the mobile electronic apparatus 102 illustrated in FIG. 1, and thus makes reference to the elements cited therein. It should, however, be understood that the method 200 is not limited to the elements set forth in the mobile electronic apparatus 102. Instead, it should be understood that the method 200 may be practiced by a mobile electronic apparatus having a different configuration than that set forth in FIG. 1.

At step 202, the mobile electronic apparatus 102 receives motion, for instance, by a user walking, running, driving, etc. The motion causes the mass 116 to rotate due to its eccentric position on the shaft 114. The rotation of the mass 116 causes the shaft 114 to rotate thereby causing the rotor 115 to rotate with respect to the stator 117.

At step 204, the mechanical energy generated by the relative rotation of the rotor 115 with respect to the stator 117 is converted into electrical energy and the electrical energy is harvested by the recharging circuitry 150. More particularly, for instance, opposite to the operation of the stator 117 applying a magnetic force on the rotor 115 to cause it to spin, the rotation of the rotor 115 with respect to the magnets in the stator 117 creates a current that the recharging circuit 150 is configured to harvest. In other words, the motor 112 itself operates as an electric generator.

The recharging circuitry 150 is also configured to supply the harvested current to the storage device 120, to thereby recharge the storage device 120, as indicated at step 206.

Figure 3:
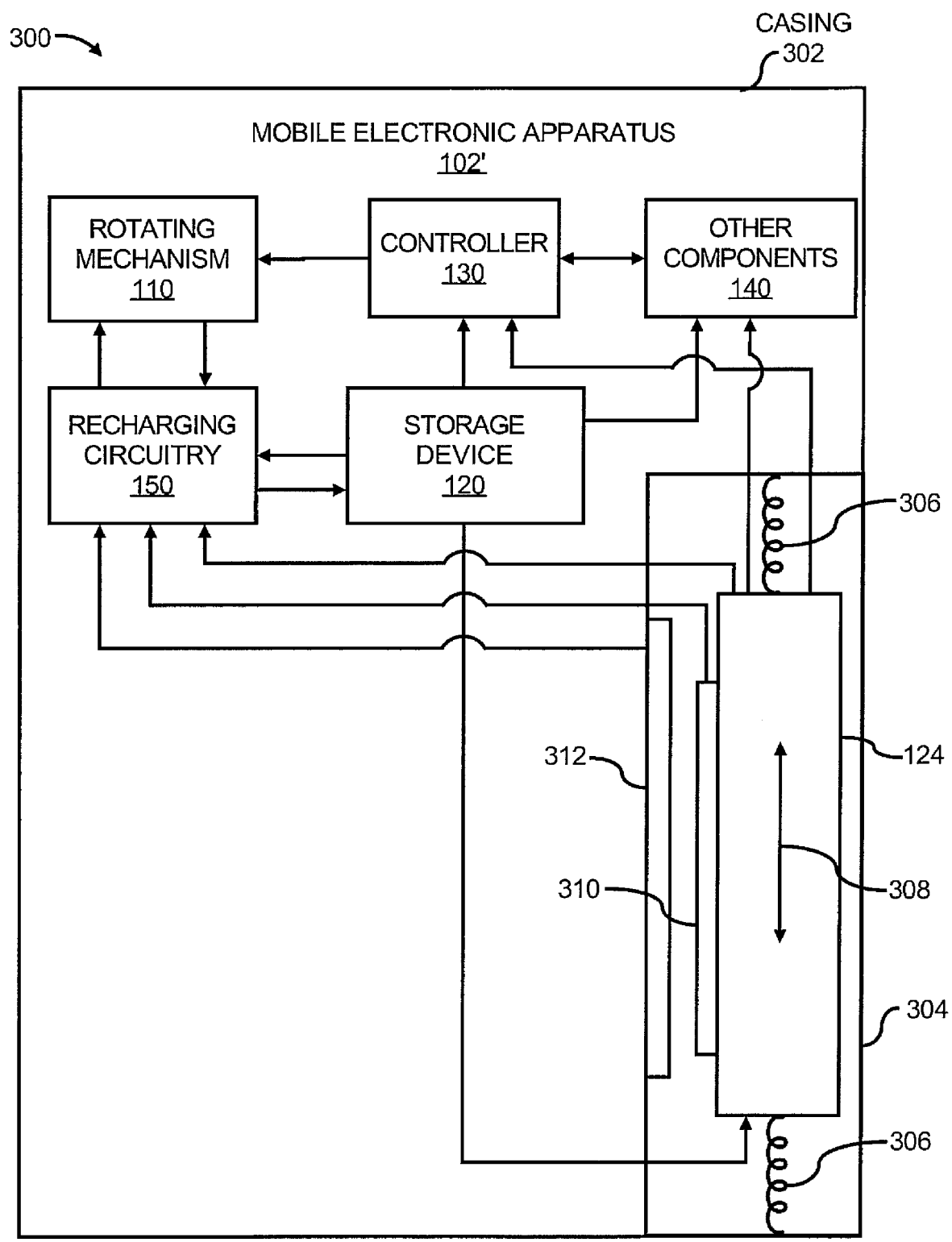
FIG. 3 shows a simplified schematic block diagram of mobile electronic apparatus having a storage device configured to be recharged through relative movement of a battery and the mobile electronic apparatus, according to an embodiment of the invention.

With reference now to FIG. 3, there is shown a simplified schematic block diagram 300 of a mobile electronic apparatus 102' having a storage device 120 configured to be recharged through relative movement of a relatively heavy component 124 and the mobile electronic apparatus 102', according to an example. It should be understood that the mobile electronic apparatus 102' may include additional components and that some of the components described herein may be removed and/or modified without departing from a scope of the mobile electronic apparatus 102' depicted in FIG. 3.

The mobile electronic apparatus 102' depicted in FIG. 3 may comprise any of the portable electronic devices having a vibrating or silent alarm feature as discussed above with respect to the mobile electronic apparatus 102 depicted in FIG. 1. In addition, the mobile electronic apparatus 102' includes many of the same components described above with respect to the mobile electronic apparatus 102 depicted in FIG. 1. Therefore, the rotating mechanism 110, the controller 130, and the other components 140 will not be described again with respect to the mobile electronic apparatus 102'.

The main difference between the mobile electronic apparatus 102' and the mobile electronic apparatus 102 is that the mobile electronic apparatus 102' includes the relatively heavy component 124, which may comprise the capacitor, which is shown in FIG. 1. The relatively heavy component 124 is mounted in the mobile electronic apparatus 102' such that it is linearly movable with respect to a casing 302 of the mobile electronic apparatus 102'. In addition, mechanical energy generated by the movement of the relatively heavy component 124 is converted into electrical energy and used to recharge the storage device 120.

As shown in FIG. 3, the relatively heavy component 124 is housed in a cavity 304 of the mobile electronic apparatus 102'. The relatively heavy component 124 is, more particularly, supported on both ends thereof to opposing sides of the cavity 304 by springs 306. The springs 306 generally enable the relatively heavy component 124 to move in the direction indicated by the arrow 308. In this regard, the relatively heavy component 124 may have sufficient weight to enable the relatively heavy component 124 to move with respect to the cavity 304 when the mobile electronic apparatus 102' is moved under normal motion, such as, when a user is walking, running, driving, etc. In addition, the relatively heavy component 124 may comprise an existing component found in mobile electronic apparatus 102' having the sufficient weight, such as, a capacitor 122.

In addition, the relatively heavy component 124 includes a first part 310 of a linear motor and a second part 312 of a linear motor is attached to a wall of the cavity 304. In this regard, an electric current may be converted from the mechanical energy generated from the relative motion between the relatively heavy component 124 and therefore the first part 310 of the linear motor and the second part 312 of the linear motor. As above, the recharging circuitry 150 may harvest the converted electrical energy and may supply it back to the storage device 120 to therefore recharge the storage device 120.

According to an example, the electrical energy harvested from the movement of the relatively heavy component 124 may supplement the electrical energy harvested from the movement of the mass 116 to recharge the storage device 120. In addition, or alternatively, the electrical energy stored in the storage device 120 may be supplied to one or more of the controller 130, the other components 140, and the capacitor 122.

Figure 4:
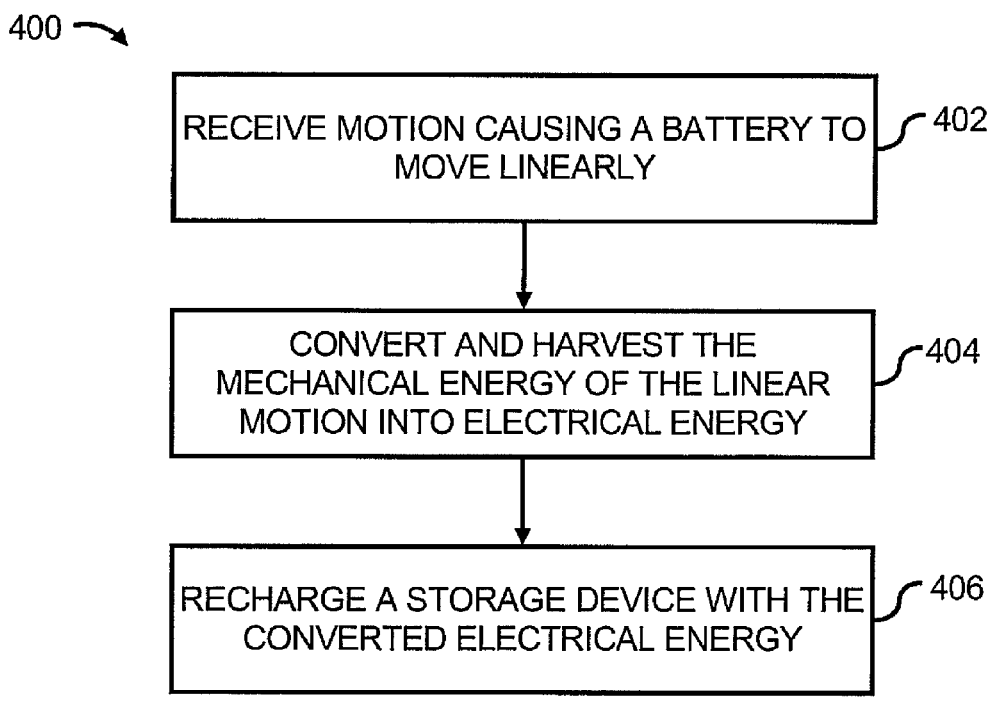
FIG. 4 shows a flow diagram of a method for recharging a storage device of a mobile electronic apparatus having a rotating mechanism and a movable battery, according to an embodiment of the invention.

Turning now to FIG. 4, there is shown a flow diagram of a method 400 for recharging a storage device 120 of a mobile electronic apparatus 102' having a relatively heavy component 124 that is linearly movable with respect to a casing 302 of the mobile electronic apparatus 102', according to an example. It should be apparent to those of ordinary skill in the art that the method 400 represents a generalized illustration and that other steps may be added or existing steps may be removed, modified or rearranged without departing from a scope of the method 400.

According to an example, the method 400 may be implemented in conjunction with the method 200. The method 400 may be also implemented when the method 200 is disabled due to, for instance, the controller 130 employing the rotating mechanism 110 to cause the mobile electronic apparatus 102 to vibrate. Alternatively, the method 400 may be implemented independently of the method 200 and may thus be implemented in a mobile electronic apparatus 102' that does not include a rotating mechanism 110.

In addition, the description of the method 400 is made with reference to the mobile electronic apparatus 102' illustrated in FIG. 3, and thus makes reference to the elements cited therein. It should, however, be understood that the method 400 is not limited to the elements set forth in the mobile electronic apparatus 102', but instead, may be practiced by a mobile electronic apparatus having a different configuration than that set forth in FIG. 3.

At step 402, the mobile electronic apparatus 102' receives motion, for instance, by a user walking, running, driving, etc. The motion causes the relatively heavy component 124 to move linearly with respect to the mobile electronic apparatus casing 302. The linear motion also causes the first part 310 of a linear motor to move with respect to the second part 312 of the linear motor.

At step 404, the mechanical energy generated by the relative linear motion between the first part 310 and the second part 312 of the linear motor is converted into electrical energy and the electrical energy is harvested by the recharging circuitry 150. More particularly, for instance, the first part 310 may comprise an electrically conductive material and the second part 312 may comprise a magnet, or vice versa. As such, when the first part 310 moves in relation to the second part 312, an electric current may be generated.

The recharging circuitry 150 is also configured to supply the harvested current to the storage device 120, as indicated at step 406.

Through implementation of the systems and methods disclosed herein, a mobile electronic apparatus 102, 102' may be configured to have a compact design while being configured to convert mechanical movements into electrical energy for recharging a storage device of the mobile electronic apparatus 102, 102'. In addition, a user may recharge the storage device in a mobile electronic apparatus 102, 102' simply by performing normal tasks, such as, walking, running, driving, etc.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A mobile electronic apparatus comprising:
  a storage device for storing electrical energy;
  a rotating mechanism configured to energize the apparatus comprising,
    a motor;
    a shaft connected to the motor;
    a mass eccentrically attached to the shaft, wherein, in a first state, the motor is configured to receive electrical energy and to consume the electrical energy to rotate the shaft and the mass to cause the mobile electronic apparatus to vibrate when activated, and wherein, in a second state, motion of the mobile electronic apparatus is configured to cause the mass and the shaft to rotate with respect to the motor, wherein rotation of the shaft with respect to the motor is converted into electrical energy; and circuitry for harvesting the electrical energy and for recharging the storage device with the harvested electrical energy.

2. The mobile electronic apparatus according to claim 1, further comprising:
a controller configured to activate the motor and cause the shaft to rotate in response to one or more conditions occurring, wherein the circuitry is configured to harvest the electrical energy when the controller has not activated the motor.

3. The mobile electronic apparatus according to claim 1, wherein the motor comprises a direct current motor having a rotor, stator, and bearings, and wherein the rotor is configured to rotate with respect to the stator when the motor is inactive to thereby generate the electrical energy.

4. The mobile electronic apparatus according to claim 1, further comprising:
a relatively heavy component; and
a cavity, wherein the relatively heavy component is resiliently attached to a pair of opposing walls in the cavity by a pair of springs, such that the relatively heavy component is linearly movable with respect to the pair of opposing walls in the cavity.

5. The mobile electronic apparatus according to claim 4, further comprising:
a linear motor having a first part and a second part, wherein the first part is attached a wall of the cavity and the second part is attached to the relatively heavy component along a side facing the second part, such that relative movement between the first part and the second part creates an electric current.

6. The mobile electronic apparatus according to claim 1, wherein the storage device is further configured to supply at least one component in the mobile electronic apparatus with electrical energy.

7. The mobile electronic apparatus according to claim 1, further comprising:
a rechargeable battery, wherein the storage device is further configured to supply electrical energy to the rechargeable battery.

8. The mobile electronic apparatus according to claim 1, wherein the mobile electronic apparatus comprises at least one of a cellular telephone, a personal digital assistant, a video game controller, a portable gaming system, a portable media player, and a pager.

9. A method for recharging an electrical energy storage device of a mobile electronic apparatus having a rotating mechanism, said rotating mechanism having a motor, a shaft attached to the motor, and a mass eccentrically attached to the shaft, wherein application of electrical energy into the motor causes the motor to rotate the shaft and the mass, said method comprising:
receiving motion on the mobile electronic apparatus that causes the mass and the shaft to rotate with respect to the motor;
in the motor, converting mechanical energy resulting from the rotation of the shaft to electrical energy;
harvesting the electrical energy; and
recharging the electrical energy storage device with the harvested electrical energy.

10. The method according to claim 9, wherein the mobile electronic apparatus further comprises a cavity, wherein the battery is resiliently attached to a pair of opposing walls in the cavity, such that the battery is at least linearly movable with respect to the pair of opposing walls in the cavity, said method further comprising:
receiving motion on the mobile electronic apparatus that causes the battery to move with respect to the walls of the cavity;
converting mechanical energy resulting from the linear motion of the battery into electrical energy;
harvesting the electrical energy; and
recharging the electrical energy storage device with the harvested electrical energy.

11. The method according to claim 10, wherein converting the mechanical energy resulting from the linear motion further comprises converting the mechanical energy through use of a linear motor having a first part attached to a wall of the cavity and a second part attached to the battery facing the first part.

12. The method according to claim 9, wherein receiving motion on the mobile electronic apparatus further comprises receiving motion arising from normal user movement, said normal user movement comprising at least one of walking, running, bicycling, and driving.

13. The method according to claim 9, further comprising:
activating the rotating mechanism to cause the mobile electronic apparatus to vibrate in response to a predetermined condition occurring, and wherein the activation of the rotating mechanism disables the ability of the motor to convert mechanical energy into electrical energy.

14. A system for recharging an electrical energy storage device of a mobile electronic apparatus, said system comprising:
a rotating mechanism for causing the mobile electronic apparatus to vibrate in response to a predetermined condition occurring, said rotating mechanism having a motor having a rotor and a stator, a shaft connected to the rotor, and a mass eccentrically attached to the shaft, wherein the mass is configured to cause the shaft and the rotor to rotate with respect to the stator during normal movement of the mass, wherein, in a first state, relative movement of the rotor with respect to the stator is converted into an electrical current and wherein, in a second state, application of electrical energy into the stator is configured to cause the rotor and the mass to rotate with respect to the stator to cause the mobile electronic apparatus to vibrate; and
circuitry for harvesting the electrical energy and for recharging the electrical energy storage device with the harvested electrical energy when the motor is in the first state.

15. The system according to claim 14, wherein the mobile electronic apparatus comprises a cavity for housing a relatively heavy component, wherein the relatively heavy component is sufficiently smaller than the cavity to enable the relatively heavy component to move linearly within the cavity, the system further comprising:
springs for attaching the relatively heavy component to the cavity to thereby enable the relatively heavy component to move linearly within the cavity; and
a linear motor having a first part and a second part, wherein the first part is attachable to a wall of the cavity and the second part is attachable to the relatively heavy component along a side facing the second part, such that relative movement between the first part and the second part is converted into an electric current supplied into the electrical energy storage device.

16. The system according to claim 15, wherein the storage device is further configured to supply at least one component in the mobile electronic apparatus with electrical energy.

* * * * *

UNITED STATES PATENT AND TRADEMARK OFFICE
CERTIFICATE OF CORRECTION

| | | |
|---|---|---|
| PATENT NO. | : 7,888,892 B2 | Page 1 of 1 |
| APPLICATION NO. | : 11/779547 | |
| DATED | : February 15, 2011 | |
| INVENTOR(S) | : Alan A. McReynolds et al. | |

It is certified that error appears in the above-identified patent and that said Letters Patent is hereby corrected as shown below:

In column 5, line 17(Approx.), delete "capacitor," and insert -- capacitor 122, --, therefor.

Signed and Sealed this
Twentieth Day of December, 2011

David J. Kappos
*Director of the United States Patent and Trademark Office*